M. CHRISTMAN.
WHEEL HUB PLATE.
APPLICATION FILED OCT. 31, 1911.
1,020,885.
Patented Mar. 19, 1912.
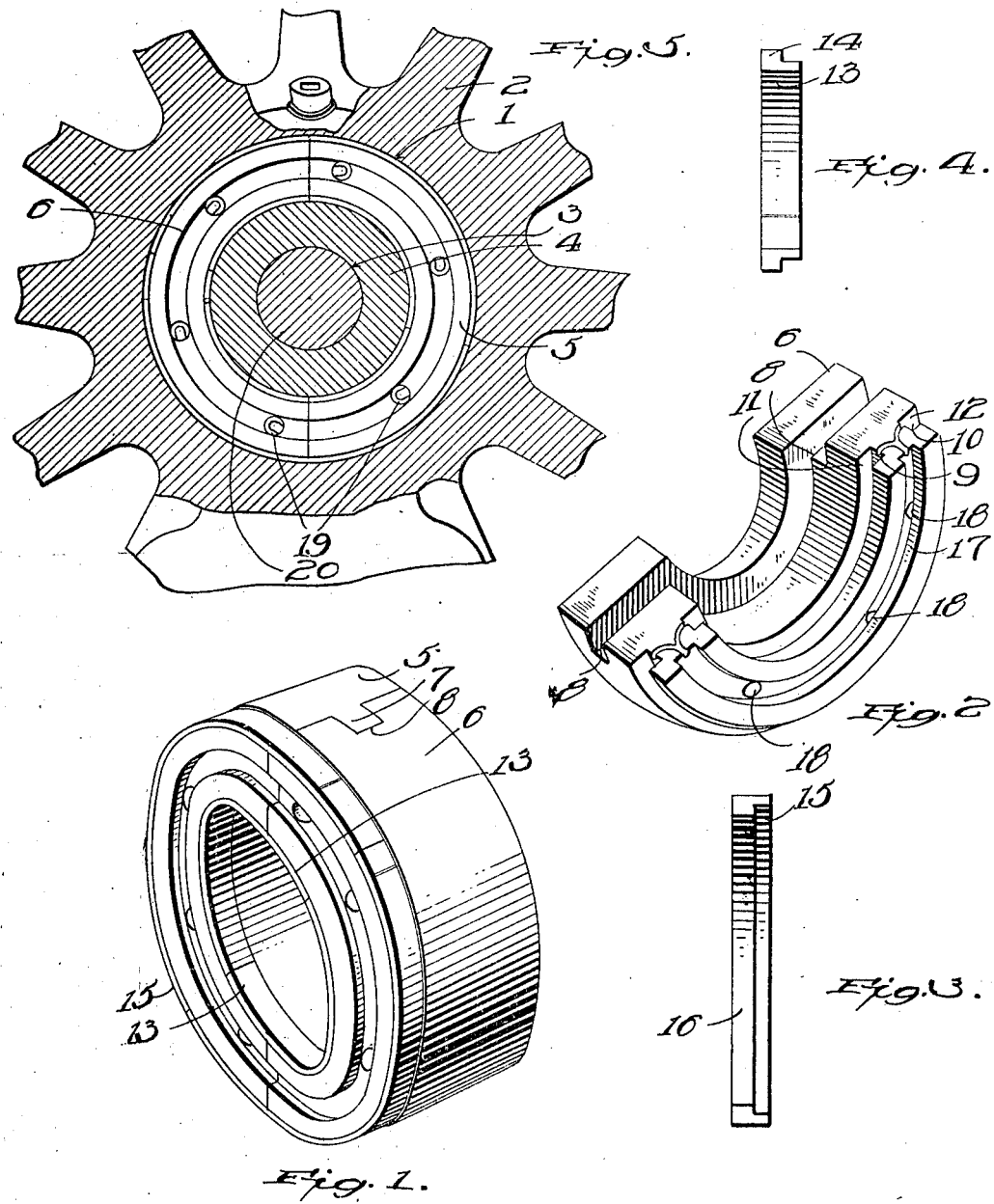
WITNESSES
INVENTOR
Matthias Christman
By E. E. Vrooman, Attorney.

UNITED STATES PATENT OFFICE.

MATTHIAS CHRISTMAN, OF SPRINGFIELD, MISSOURI, ASSIGNOR OF ONE-THIRD TO HARRY L. BISSETT AND ONE-THIRD TO GEORGE A. McLAUGHLIN, BOTH OF SPRINGFIELD, MISSOURI.

WHEEL-HUB PLATE.

1,020,885.  Specification of Letters Patent.  Patented Mar. 19, 1912.

Application filed October 31, 1911.  Serial No. 657,737.

*To all whom it may concern:*

Be it known that I, MATTHIAS CHRISTMAN, a citizen of the United States, residing at Springfield, in the county of Greene and State of Missouri, have invented certain new and useful Improvements in Wheel-Hub Plates, of which the following is a specification, reference being had therein to the accompanying drawing.

This invention relates to hub plates, and the principal object of the same is to provide the hub plate with liner bands which will hold the sections of the hub plate together and which will also hold the hub plate in the hub of the wheel.

This invention is illustrated in the accompanying drawings, wherein:—

Figure 1 is a perspective view of the improved hub plate. Fig. 2 is a perspective view of one of the sections of the hub plate. Fig. 3 is a view of one of the outer liners which surround the hub plate and hold the sections together. Fig. 4 is a view of one of the inner liners which is positioned within the hub plates and which assists in holding the sections together. Fig. 5 is a fragmentary view of the hub of the wheel showing the improved hub plate in place.

This hub plate is intended to be used on the driving wheel of a locomotive and is seated within an annular recess 1, which is formed in the inner face of the wheel 2 and is spaced from the central opening 3 of the wheel by an annular shoulder 4.

The hub plate comprises a pair of sections 5 and 6 each of which is semi-circular. The plates of the sections are held together by means of the tenons 7 which are formed upon the ends of the section 5 and fit within the mortises 8 which are cut in the ends of the section 6. The inner portion of each of the sections is reduced and is provided with the internal groove 9 and with the external groove 10. By having the inner portion of the section reduced the ledges 11 and 12 are formed upon which the locking liners rest.

The locking liners comprise the inner semi-circular bands 13 each of which is provided with the flange 14 which extends into the groove 9. The outer liners are also formed from semi-circular bands 15 each of which is provided with the flange 16 which fits within the grooves 10. The inner liner is of such dimension that it will fit snugly within the grooves 9, and not project beyond the flange 11. The outer liners 15 are formed from spring metal and are slightly sprung so that the end portions project slightly beyond the flange 12 so that when the plate is positioned within the recess 1 the outer liners will be slightly compressed and cause the plate to be held within the recess by the spring action of the outer liners.

The inner face of the plate is provided with the annular groove 17, and a plurality of openings 18 lead from the groove 17 through the plate to permit the passage of securing pins 19 which enter sockets formed in the hub and prevent rotary movement of the plate in the wheel hub.

In the operation of the device the two sections of the hub plate are placed together with the internal and external liner bands in position as shown in Fig. 1. In order to insert the plate in the recess formed in the hub the outer bands have to be compressed slightly. When the plate is in the recess the bands expand and frictionally engage the sides of the recess thus holding the plate sections together and the plate in the recess.

What I claim as my invention is:—

1. A wheel provided with an annular recess, a hub plate mounted within said recess, said hub plate provided with a reduced inner end and with annular grooves formed therein to form seats, locking rings positioned within said seats to hold said plate within said recess, and means for locking said plate against rotation within said recess.

2. A wheel provided with an annular recess, a hub plate mounted within said recess, said hub plate formed of a plurality of arcuate sections, interlocking joints formed upon the abutting ends of said sections, the inner portions of said sections being provided with annular grooves forming seats, and locking bands mounted within said seats and adapted to secure said sections together and hold said plate within said recess.

3. A wheel provided with an annular recess, a hub plate mounted within said recess, said hub plate formed of a plurality of sections, common means for holding said sections together, and for holding said hub plate within said recess, and common means for preventing the rotation of said plate within said recess and for permitting the passage of a lubricant through said plate.

4. A hub plate comprising arcuate sections provided with grooves near their inner ends and liner bands positioned within said grooves and holding said sections together.

5. A hub plate provided with a reduced inner end and with annular grooves formed in the reduced end and constituting seats, and locking rings positioned within said seats to hold said plate in position.

6. A hub plate formed from a plurality of arcuate sections, interlocking joints formed upon the abutting ends of said sections, said sections being provided with annular grooves forming seats, locking bands mounted within said seats and adapted to secure said sections together and hold said plate in position.

7. A hub plate formed from a plurality of sections, common means for holding said sections together and for holding said hub plate within a recess, and means for preventing the rotation of said plate within the recess and for permitting the passage of a lubricant through said plate.

8. A wheel provided with an annular recess, a hub plate mounted within said recess, said hub plate comprising arcuate sections provided with grooves near their inner ends, and liner bands positioned within said grooves, and holding said sections together within said recess.

9. A hub plate comprising a plurality of sections, and resilient means for holding said sections together.

10. A hub plate comprising a plurality of sections, and bands holding said sections together, said bands being each formed from a plurality of sections.

11. A hub plate comprising a plurality of sections, inner and outer bands for connecting said sections, said inner bands being formed from rigid metal and said outer band being formed from resilient metal.

12. A hub plate comprising a plurality of sections, bands positioned within said hub plate, and bands surrounding said hub plate.

In testimony whereof I hereunto affix my signature in presence of two witnesses.

MATTHIAS CHRISTMAN.

Witnesses:
 WM. H. HORINE,
 GEO. A. MCLAUGHLIN.

Copies of this patent may be obtained for five cents each, by addressing the "Commissioner of Patents, Washington, D. C."